United States Patent [19]

Peters

[11] Patent Number: 5,232,954

[45] Date of Patent: Aug. 3, 1993

[54] PROCESS FOR RECOVERING THERMOPLASTIC RESINS USING ESTERS

[76] Inventor: Donald F. Peters, 11733 Lake Avenue, Suite 11, Lakewood, Ohio 44107

[21] Appl. No.: 882,451

[22] Filed: May 12, 1992

[51] Int. Cl.$^5$ ............................................ C08J 11/04
[52] U.S. Cl. .................... 521/47; 521/42.5; 521/46; 521/46.5; 521/47
[58] Field of Search ............. 521/47, 46.5, 46, 42.5

[56] References Cited

U.S. PATENT DOCUMENTS

| | | | |
|---|---|---|---|
| 2,270,184 | 1/1942 | Dreisbach | 521/47 |
| 3,535,408 | 10/1970 | Ronden | 264/37 |
| 3,666,691 | 5/1972 | Spiller | 260/2.3 |
| 3,736,271 | 5/1973 | Schutze et al. | 260/2.3 |
| 3,799,235 | 3/1974 | Moosavian et al. | 159/3 |
| 3,857,799 | 12/1974 | Ooba et al. | 521/47 |
| 3,864,181 | 2/1975 | Wolinski et al. | 156/79 |
| 3,989,650 | 11/1976 | Lange et al. | 260/2.1 E |
| 4,031,039 | 6/1977 | Mizumoto et al. | 260/2.3 |
| 4,132,633 | 1/1979 | Saitoh et al. | 209/9 |
| 4,164,484 | 8/1979 | Tokuda et al. | 260/2.3 |
| 4,196,105 | 4/1980 | Kubat et al. | 260/2.3 |
| 4,379,724 | 4/1983 | Kashiwagi | 134/1 |
| 4,517,312 | 5/1985 | Kumasaka et al. | 521/47 |
| 4,771,110 | 9/1988 | Bauman et al. | 525/131 |
| 5,003,143 | 3/1991 | Marks et al. | 219/10.55 M |

OTHER PUBLICATIONS

Derwent Publication 89-077923/11 (DE 3741-777-C).

*Primary Examiner*—Paul R. Michl
*Assistant Examiner*—Olga Asinovsky
*Attorney, Agent, or Firm*—Renner, Otto, Boisselle & Sklar

[57] ABSTRACT

This invention relates to a process for recovering an ester-soluble thermoplastic resin comprising the steps of (1) crushing a shaped thermoplastic resin, (2) contacting the crushed thermoplastic resin with an ester to form a mixture, and (3) recovering the thermoplastic resin from the mixture by removing the ester or precipitating the thermoplastic resin. This invention also relates to a process for removing ester-insoluble impurities from the thermoplastic resin. The process uses non-halogenated and hydrocarbon free solvents to recover thermoplastic resins. This invention provides a means to recover shaped thermoplastic resin without adversely affecting the thermoplastic resin, such as its molecular weight.

21 Claims, 1 Drawing Sheet

PROCESS FOR RECOVERING THERMOPLASTIC RESINS USING ESTERS

TECHNICAL FIELD OF THE INVENTION

The present invention relates to a process for recovering thermoplastic resins. More particularly, the process uses esters for recovering thermoplastic resins.

BACKGROUND OF THE INVENTION

Thermoplastic resins, such as polystyrene, are shaped to form useful articles such as spoons, cups and other various containers. After their use, these materials have often been discarded. These articles become waste which are primarily either burnt or buried. Either burning or burying these articles causes environmental pollution. A process which recovers the thermoplastic resin in a useable form from these articles is highly desirable. By regenerating the thermoplastic resin and using this resin to form new articles, the accumulation of these articles in the environment is greatly reduced.

For recovered thermoplastic resins to be useful in general application, these thermoplastic resins must not be adversely affected by the recycling process. Any great reductions in molecular weight or fractional distribution of thermoplastic resin may render thermoplastic resin unable to form useful commercial products.

U.S. Pat. No. 3,857,799 issued to Ooba et al. relates to a process for regeneration of plastics. Plastics are regenerated by mixing the plastic with an ether-type polyester and at least one member selected from the group consisting of a homopolymer of vinylacetate, and ethylene-vinylacetate copolymer or tachypolyolefin. If necessary, a foaming agent may be added to the mixture. The mixture is then molded into a shape. The ether-type polyester is prepared by adding polyethyleneterephthalate to glycols. The polyether-type polyester is a polyethyleneterephthalate.

U.S. Pat. No. 4,031,039 issued to Mizumoto et al. relates to a method for treating waste high-polymer mixtures. This process involves fractionating the mixture by taking advantage of dissimilar solubilities of the polymers in different organic solvents characterized in that the mixture is brought into contact with o-xylene, p-xylene or m-xylene. The solvents are used singularly or in combination at a temperature within a certain range to dissolve and fractionate the mixture. The mixture consists essentially of five groups of five polymers; olefinic, polystyrenic, polyvinyl-chloride, thermosetting and natural high-polymers. The polystyrenic and polyolefinic high-polymers are removed with the xylene solvents. The remaining polymers are fractionated by using at least one solvent selected from tetrahydrofuran, cyclohexanone, dioxane, and methylethylketone.

U.S. Pat. No. 4,164,484 issued to Tokuda et al. relates to a process for recovering polyolefin and polystyrene materials. This process involves dissolving a mixture of plastics containing polyolefin-type plastics in a hydrocarbon solvent, preferably a xylene type, at a temperature not lower than 60° C. The process involves vacuum-evaporating the solvent of the solution to cause precipitation of the dissolved polyolefin-type plastics and separating and recovering the major portion of the precipitate. The solution of concentrated liquor containing the precipitate and the essentially precipitate free upper phase solution are separated. The liquor is recycled and the solvent is removed from the upper phase.

U.S. Pat. No. 4,196,105 issued to Kubat relates to a process of recovery of polystyrene using liquid sulfur dioxide. This process involves contacting the polystyrene-containing starting material with liquid sulfur dioxide, thus dissolving polystyrene and the resulting polystyrene-sulfur dioxide system forms two layers. The upper layer contains low and high molecular fractions of polystyrene and the lower layer contains liquid sulfur dioxide which is generally free of polystyrene. This patent also teaches that low molecular weight portions of polystyrene can be removed from the upper phase by repeated extraction with pure sulfur dioxide.

U.S. Pat. No. 4,517,312 issued to Kumasaka et al. relates to a process for regenerating resin. The process involves regenerating a resin by dissolving the resin in an organic solvent, such as methylene chloride, trichloroethylene, or carbontetrachloride to form a resin solution. The solution is mixed with a liquid where the resin separates from the mixture of the resin solution in the liquid and the resin is recovered. The liquid has a temperature higher than the boiling point of the solvent and has a specific gravity smaller than that of the solvent and larger than that of the resin. The liquid is preferably water.

SUMMARY OF THE INVENTION

This invention relates to a process for recovering an ester-soluble thermoplastic resin comprising the steps of (1) crushing a shaped thermoplastic resin, (2) contacting the crushed thermoplastic resin with an ester to form a mixture, and (3) recovering the thermoplastic resin from the mixture by removing the ester or precipitating the thermoplastic resin. This invention also relates to a process for removing ester-insoluble impurities from the thermoplastic resin. The process uses non-halogenated (e.g., chlorine and/or fluorine free) and hydrocarbon free solvents to recover thermoplastic resins. This invention provides a means to recover shaped thermoplastic resin without adversely affecting the thermoplastic resin, such as its molecular weight.

DETAILED DESCRIPTION OF THE INVENTION

Figure 1:
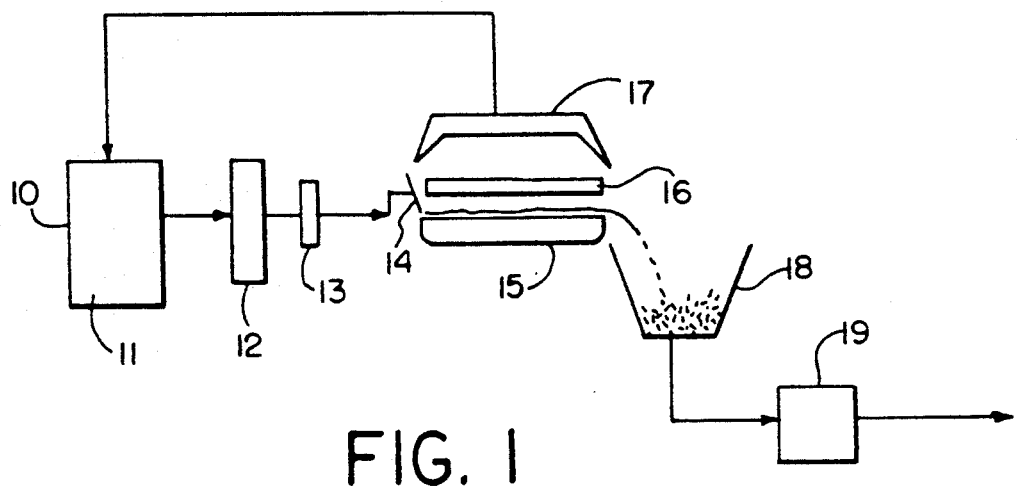
FIG. 1 is a block diagram showing an embodiment of the process of the present invention.

As described above, the present invention involves a process for recovering thermoplastic resins which are soluble in esters. In one embodiment, the thermoplastic resin is a polystyrene. The process of the present invention works on foamed or expanded thermoplastic resins as well as thermoplastic resin sheets and films.

It should be recognized that processes of the present invention relates to a means of recovering thermoplastic resin from shaped and formed articles. These articles may be foam (e.g., expanded) or unfoamed, and may include cups, food containers, thermal-insulating board, as well as films and sheets of the thermoplastic resin. The shaped thermoplastic resins are pulverized and/or crushed.

The recovery of the thermoplastic resin is based on the ability of the ester to dissolve the thermoplastic resin without adversely affecting the structure and integrity of the thermoplastic resin. By using the ester, the thermoplastic resin may be dissolved and recovered in a useable form. The inventor has discovered that the use of esters provides an efficient means to recover thermoplastic resins. The ester is used in any amount sufficient to dissolve the thermoplastic resin. Generally, from about 1, or about 5, or from about 6, up to about 12, or to about 10, or to about 8, parts of ester-soluble resin are used for each part of ester.

The ester used to dissolve the thermoplastic resin is a carboxylic ester having from 1 to about 21, or to about 12, or to about 8 or to about 6, or about 4 carbon atoms in the carboxy portion of the ester. The alkoxy portion of the ester has from 1, or about 2, or about 3 up to about 30, or to about 24, or to about 12, or to about 8 carbon atoms. In one embodiment, the carboxy portion of the ester has from 1 to about 4 carbon atoms, and the alkoxy portion of the ester has from 3 to about 8, or about 4 carbon atoms. Examples of carboxylic esters include ethyl, propyl, butyl, amyl, isopentyl, hexyl or benzylphenylacetate; ethyl, propyl, butyl, amyl, isopentyl or hexylpropanoate; and the like. In one embodiment, the carboxylic esters are acetic esters. A particularly useful carboxylic ester is amyl acetate.

In one embodiment, the carboxylic ester is represented by the formula

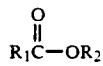

wherein $R_1$ contains from 1 to about 21, or about 12, or about 8, or about 6, or about 4 carbon atoms, and $R_2$ contains from about 1, or about 2, or about 3 up to about 30, or to about 24, or to about 12, or to about 8 carbon atoms. In one embodiment, $R_1$ is a methyl, ethyl or propyl group, preferably a methyl group. In one embodiment, $R_2$ is an ethyl, propyl, butyl, amyl, isopentyl, hexyl, octyl, decyl, dodecyl, hexadecyl, or benzylphenyl group, preferably a propyl, butyl, amyl, isopentyl or hexyl group, more preferably an amyl or isopentyl groups.

The present invention provides a process for recovering shaped ester-soluble thermoplastic resins. The process involves the steps of contacting a shaped, ester-soluble thermoplastic resin with an ester to form a mixture. The thermoplastic resin is recovered by removing the ester or precipitating the thermoplastic resin.

In one embodiment, the thermoplastic resin is recovered by removal of the ester. The ester may be removed by simple distillation or a vacuum distillation. When utilizing vacuum distillation, the vacuum in a system is sufficient to remove the ester from the mixture. Generally, the vacuum is from about 50, or about 75 up to about 500, or to about 300, or to about 200, or to about 150 mm Hg. of mercury. The temperature used for distillation of the ester may be any temperature sufficient to remove the ester from the mixture provided the resin does not degrade. Generally, the temperature is from about 90° C., or about 100° C., or about 105° C. up to about 180° C., or to about 170° C., or to about 150° C. to about 130° C., or to about 120° C. provided the resin does not degrade. When temperatures above 130° C. are used, the amount of time that the resin is exposed to the temperature should be limited to ensure that the thermoplastic resin doesn't degrade. The amount of time is usually 15 minutes or less, or 10 minutes or less than, or 5 minutes or less.

In another embodiment, vacuum distillation could be vacuum flash distillation. Vacuum flash distillation occurs in a vacuum flash evaporator. The ester and thermoplastic resin mixture is sprayed into a vacuum chamber where the ester is removed and the resin is recovered. The vacuum of the flash evaporator is the same as described above. In one embodiment, it has been found that the temperature in the vacuum flash evaporator may be as high as 180° C. for a short period of time, such as 5 minutes or less, without degrading the thermoplastic resin.

In another embodiment, the ester is removed by placing the mixture into a heated, vented extruder. The extruder has one or more, preferably two, three, or four vents or more. The extruder may be a single or twin screw extruder, preferably a twin screw extruder. The extruder is heated with heating jackets to a temperature sufficient to remove the ester but below a temperature where the thermoplastic resin degrades. Typically, the extruder is maintained at a temperature below 180° C. The resin passes through the extruder in about 5 seconds.

In another embodiment, the thermoplastic resin is recovered by precipitating the thermoplastic resin from the mixture by adding alcohol to the mixture. The alcohol may be any alcohol which precipitates the thermoplastic resin from the mixtures. Generally, the alcohol contains from 1 to about 8 carbon atoms, and include methyl, ethyl, propyl (including isopropyl), amyl, isopentyl, hexyl, cyclopentyl, cyclohexyl and octyl alcohols. The alcohols can be added at any temperature provided the thermoplastic resin precipitates from the mixtures. In one embodiment, the alcohols are added at room temperature to about 50° C., preferably the additional occur at room temperature, i.e., 20°–25° C.

In one embodiment, the shaped thermoplastic resin contains impurities such as food particles, inks, flame retardants (including bromine-based flame retardants) and coatings on the shaped thermoplastic resins. When the thermoplastic resin contains impurities, the thermoplastic resin and impurities are contacted with the ester to form a mixture. In one embodiment, the impurities are removed from this mixture, such as by filtration, and the thermoplastic resin is recovered by removing the ester or precipitating the resin. The impurities may be removed by any process known to those in the art. A preferred way of removing impurities is by filtration or centrifugation. Filtration may occur through paper, cloth or a metal screen. In one embodiment, the filtration occurs through a metal screen pak. The size of the screen may be any size sufficient to remove the impurities. A particularly useful screen size is 100 mesh. In another embodiment, the thermoplastic resin may contain bromine flame retardants. Examples of bromine flame retardants include hexabromocylodecane and tetrabromobisphenol A. Hexabromocyclodecane is insoluble in the ester and, therefore, it may be removed by filtration. Tetrabromobisphenol A is ester soluble and is removed with the ester from the resin. The tetrabromobisphenol A may be removed from the ester by treating the ester with a solvent in which the tetrobromobisphenol A is selectively soluble, such as cold water, and agitation. After agitation, the ester layer separates from the aqueous layer containing the tetrabromobisphenol A. The aqueous layer can then be separated from the ester solvent and the ester solvent may be recycled.

In one embodiment, crushed thermoplastic resin is delivered to a dissolving tank and mixed with ester to form a mixture. The temperature of the dissolving tank may be ambient temperature, or in one embodiment, the thermoplastic resin and ester are heated to a temperature from about 50° C., or about 60° C. up to about 100° C., or to about 80° C. The mixture may be agitated to facilitate dissolving the thermoplastic resin. The ratio of resin to ester is from about 7 to 8 to one. The mixture is passed to an evaporating tank. In the evaporating tank, the mixture is heated to a temperature of about 110° C. to 120° C. The temperature in the evaporating tank is maintained at a temperature which does not degrade the thermoplastic resin. In one embodiment, the ester is evaporated, cooled, and returned to the dissolving tank. After removing the ester, the thermoplastic resin is cooled to recover the thermoplastic resin.

Any residual amount of ester may be removed by means known to those in the art. The residual amount of ester, as well as other volatile materials, may be removed by evaporation or vacuum distillation as is known to those in the art. In one embodiment, the recovered thermoplastic resin may be placed in a vacuum chamber and heated to a temperature, as described above for the evaporating process, under vacuum to remove ester and residual volatile material. The recovered thermoplastic resin may also be placed in a microwave drying apparatus where microwave radiation heats the thermoplastic resin and volatile materials are removed by applying a vacuum. An apparatus and method of microwave drying is described in U.S. Pat. No. 5,003,140 issued to Marks et al. This reference is incorporated by reference for its description of the microwave drying apparatus and methods of using the same. In another embodiment, the resin may be exposed to any heating radiation, such as infrared or ultraviolet radiation and heated to remove ester and residual volatile material. Radiation heating apparatus, such as infrared heating apparatus, are known to those in the art. In another embodiment, the thermoplastic resin is pelletized and placed in a pellet dryer.

Generally, the level of ester remaining in the resin is about 300 ppm or less, or about 200 ppm or less. When the resin is to be used in food industries, the level of esters are about 100 ppm or less, or about 50 ppm or less.

In another embodiment of the present invention, a filter is placed between the dissolving tank and the evaporation tank. The filter may be paper, cloth, or a metal screen pak. The filter is preferably a metal screen pak filter such as a (50, or 100 up to 500, or to 400 mesh filter). In addition, a charcoal filter may be placed between the dissolving tank and the evaporation tank usually after the previously mentioned filter. In this embodiment, the crushed thermoplastic resin is delivered to dissolving tank along with impurities. The thermoplastic resin is dissolved with the ester and the impurities together with the dissolved thermoplastic resin from a mixture. The mixture is passed through metal screen and charcoal filters, where the impurities are removed. The filtered solution is passed to the evaporation tank, where the ester is removed as described above. The thermoplastic resin is then cooled and recovered.

In another embodiment of the present invention, the thermoplastic resin is delivered to a dissolving and evaporating tank along with the ester. The ester contacts the thermoplastic resin to form a mixture, and in one embodiment, a mixture of dissolved thermoplastic resin and impurities. The mixture is passed through a metal screen filter and a charcoal filter where the impurities are removed. The filtered mixture is passed back to the dissolving/evaporating tank. The ester is then removed and the resin is recovered as described above.

In another embodiment, as illustrated in FIG. 1, the thermoplastic resin is delivered to dissolving evaporating tank 10 along with the ester. The ester contacts the thermoplastic resin to form mixture 11. The mixture 11 is passed through metal screen filter 12 and charcoal filter 13 where the impurities are removed. The filter mixture is passed to an infrared drying apparatus having a doctor blade 14 (⅜", teflon coated) which spreads the mixture to a thickness of about 0.001 inches on conveyor 15. The mixture is heated by infrared source 16 to a temperature of 100° to 180° C., while the evaporating ester is collected in hood 17 and may be return to evaporation tank 10. The time exposed to infrared radiation for the mixture is about less than 5 minutes. The thermoplastic resin is passed to hopper 18 and ground in grinder 19. After grinding, the resin may be drummed or packaged as known to those in the art.

Figure 2:
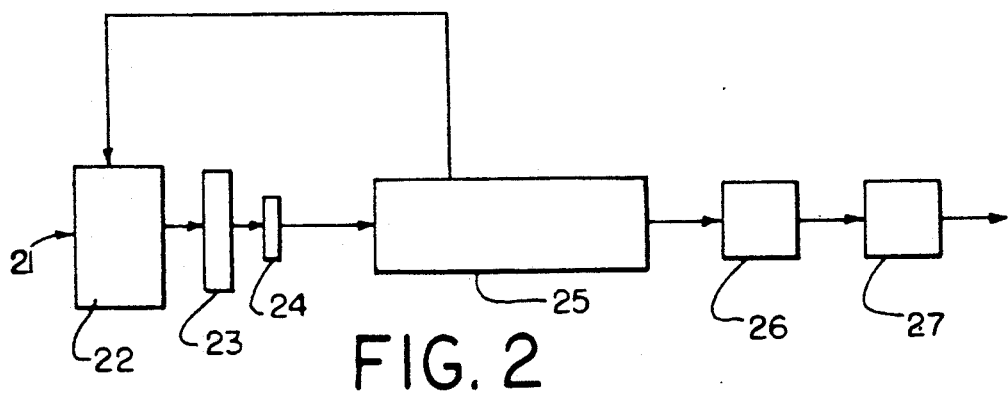
FIG. 2 is a block diagram showing an embodiment of the process of the present invention.

In another embodiment, as illustrated by FIG. 2, crushed thermoplastic resin is delivered to dissolving tank 21 along with ester and forms mixture 22. The mixture 22 is passed through metal screen filter 23 and charcoal filter 24 where impurities are removed. The mixture is passed into a double-vented, twin screw extruder. The extruder is maintained at a temperature of about 170°-180° C. The throughput rate of the extruder is set so that the mixture passes through the extruder in about 5 seconds. In one embodiment, the throughput of the extruder is set so that the mixture passes through the extruder in about 0.5, or about 1, or about 3 up to about 300, or to about 200, or to about 100, or to about 30 seconds. The ester is removed and may be returned to evaporating tank 21. The resin is passed to pelletizer 26 and the pellets are passed to pellet dryer 27. The pellets from the pellet dryer are then placed in containers, such as drums.

Figure 3:
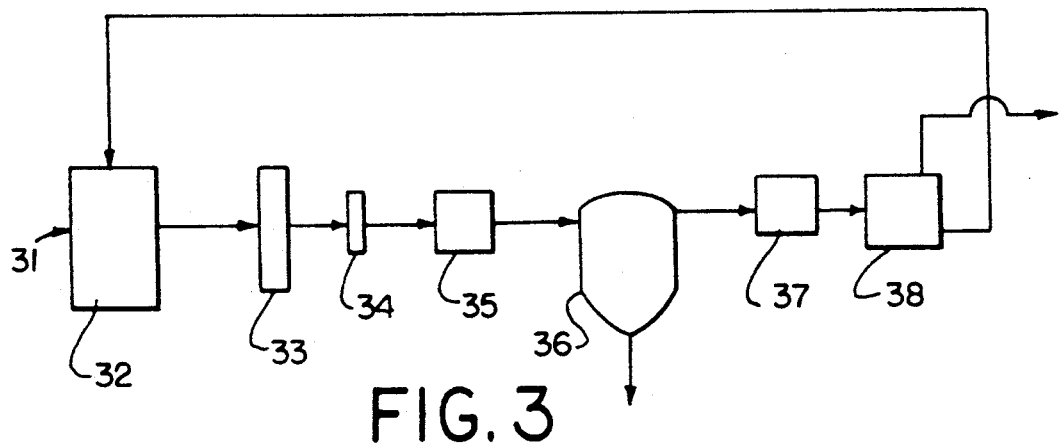
FIG. 3 is a block diagram showing an embodiment of the process of the present invention.

In another embodiment, as illustrated by FIG. 3, the crushed thermoplastic resin is delivered to dissolving tank 31 along with ester and forms mixture 32. Mixture 32 is passed through metal screen pak filter 33 and charcoal filter 34 to holding tank 35. The mixture is passed from holding tank 35 to a vacuum flash evaporator 36 where the mixture is sprayed into the vacuum chamber at 100°-180° C. and at 50-500 mm Hg. where the ester is removed to holding tank 37 and the thermoplastic resin and is collected and placed in containers, such as drums. The recovered ester in tank 37 is passed to tank 38 and mixed with cold water. The water and ester are agitated and then allowed to separate to form an aqueous layer and an ester layer. The ester layer is separated from the aqueous layer and the ester may be returned to dissolving tank 31. The aqueous layer is separated from the ester layer and discarded.

The following example illustrate the process of the present invention. In the following examples as well as elsewhere in the specification and claims, the temperature is degrees celsius, and the parts and percentages are by weight.

EXAMPLE

A polystyrene cup is crushed and dissolved in amyl acetate at a temperature of about 10° C. After the polystyrene cup is dissolved, the mixture is filtered through filter paper and passed to a distillation tank. The mixture is heated to 146° C. until the ester is removed. The residue is polystyrene and has a number average molecular weight of 112,000 and a weight average molecular weight 272,000. The residue was examined by thermalgravimetric analysis in a nitrogen atmosphere at a temperature scan rate of 10° C. per minute. Over a temperature range of 40°-130° C., the residue had a weight loss of 0.3%. In a temperature range of 40°-150° C., the residue had a weight loss of 0.7%.

The polystyrene in the cup prior to the recovery process of the present invention has a number average molecular weight of 104,000 and a weight average molecular weight of 255,600. Under the same thermalgravimetric analysis conditions the original polystyrene from the cup showed a weight loss of 0.1% by weight.

As can be seen from the above data, the process of the present invention provides a way to recover polystyrene from shaped polystyrenes. Further, there is little, if any, decrease in molecular weight of the polystyrene recovered. As can be seen by the weight loss analysis, that little volatile materials are carried along with the polystyrene in the recovery process.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

I claim:

1. A process for recovering an ester-soluble thermoplastic resin comprising the steps of (1) crushing a shaped thermoplastic resin, (2) (a) contacting the crushed thermoplastic resin with an ester to form a mixture, (b) contacting the mixture with water under agitation, and (c) separating an aqueous layer from an ester layer, and (3) recovering the thermoplastic resin from the ester layer by removing the ester or precipitating the thermoplastic resin.

2. The process of claim 1 wherein the carboxy portion of the ester has from 2 to about 22 carbon atoms, and the alkoxy portion of the ester has from 1 to about 30 carbon atoms.

3. The process of claim 1 wherein the ester is represented by the formula

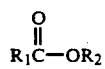

wherein $R_1$ contains from 1 to about 21 carbon atoms and $R_2$ contains from 1 to about 30 carbon atoms.

4. The process of claim 3 wherein $R_1$ contains from 1 to about 6 carbon atoms and $R_2$ contains from 1 to about 12 carbon atoms.

5. The process of claim 1 wherein the ester is amyl acetate.

6. The process of claim 1 wherein step (2) includes heating the thermoplastic resin and ester to a temperature of about 50° C. to about 75° C.

7. The process of claim 1 wherein the thermoplastic resin is polystyrene.

8. The process of claim 1 wherein step (3) further comprises filtering the mixture before recovering the thermoplastic resin.

9. The process of claim 1 wherein step (3) comprises removal of the ester by vacuum.

10. The process of claim 1 wherein step (3) comprises precipitating the thermoplastic resin by adding alcohol to the mixture from step (2).

11. A process for recovering polystyrene comprising the steps of (1) crushing a shaped polystyrene, (2) (a) contacting the crushed polystyrene with an ester to form a mixture, (b) contacting the mixture with water under agitation, and (c) separating an aqueous layer from an ester layer, and (3) recovering the polystyrene by removing the ester from the ester layer.

12. The process of claim 11 wherein the carboxy portion of the ester has from 1 to about 12 carbon atoms and the alkoxy portion of the ester has from about 2 to about 24 carbon atoms.

13. The process of claim 11 wherein the ester is represented by the formula

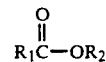

wherein $R_1$ contains from 1 to about 21 carbon atoms and $R_2$ contains from 1 to about 30 carbon atoms.

14. The process of claim 11 wherein the ester is amyl acetate.

15. The process of claim 11 wherein step (2) includes heating the polymer and ester to a temperature of about 50° C. to about 100° C.

16. The process of claim 11 wherein step (3) comprises removing the ester by vacuum.

17. A process for recovering a thermoplastic resin comprising the steps of (1) crushing a shaped ester-soluble thermoplastic resin containing impurities, (2) (a) contacting the crushed thermoplastic resin and impurities with an ester to form a mixture, (b) contacting the mixture with water under agitation, and (c) separating an aqueous layer from an ester layer, and (3) recovering the thermoplastic resin by (a) removing the impurities from the ester layer, and (b) removing the ester from the ester layer.

18. The process of claim 17 wherein the thermoplastic resin is polystyrene.

19. The process of claim 17 wherein the ester is represented by the formula

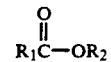

wherein $R_1$ contains from 1 to about 21 carbon atoms and $R_2$ contains from 1 to about 30 carbon atoms.

20. The process of claim 17 wherein the ester is amyl acetate.

21. A process for recovering polystyrene comprising the steps of (1) crushing a shaped polystyrene, (2) (a) contacting the crushed polystyrene with an ester to form a mixture, (b) contacting the mixture with water under agitation, and (c) separating an aqueous layer from an ester layer, and (3) recovering the polystyrene by adding alcohol to the ester layer and precipitating the polystyrene.

* * * * *